Oct. 15, 1946.　　　T. P. CUNNINGHAM　　　2,409,196
AUTOMATIC TURBO-PLANETARY TRANSMISSION
Filed March 24, 1943　　　2 Sheets-Sheet 1
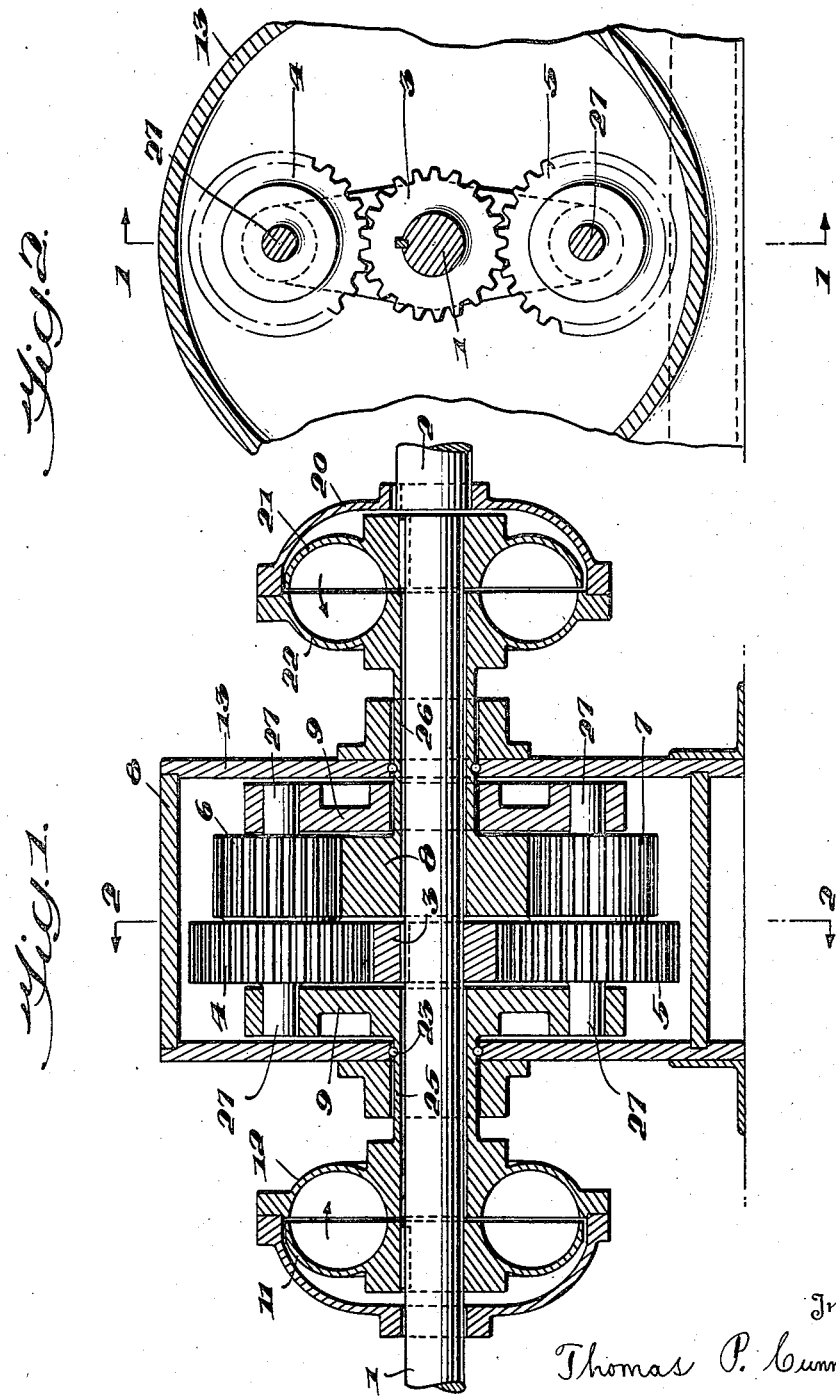
Inventor
Thomas P. Cunningham
By Vernon E. Hodges
H. Hamlin Hodges his Attorneys

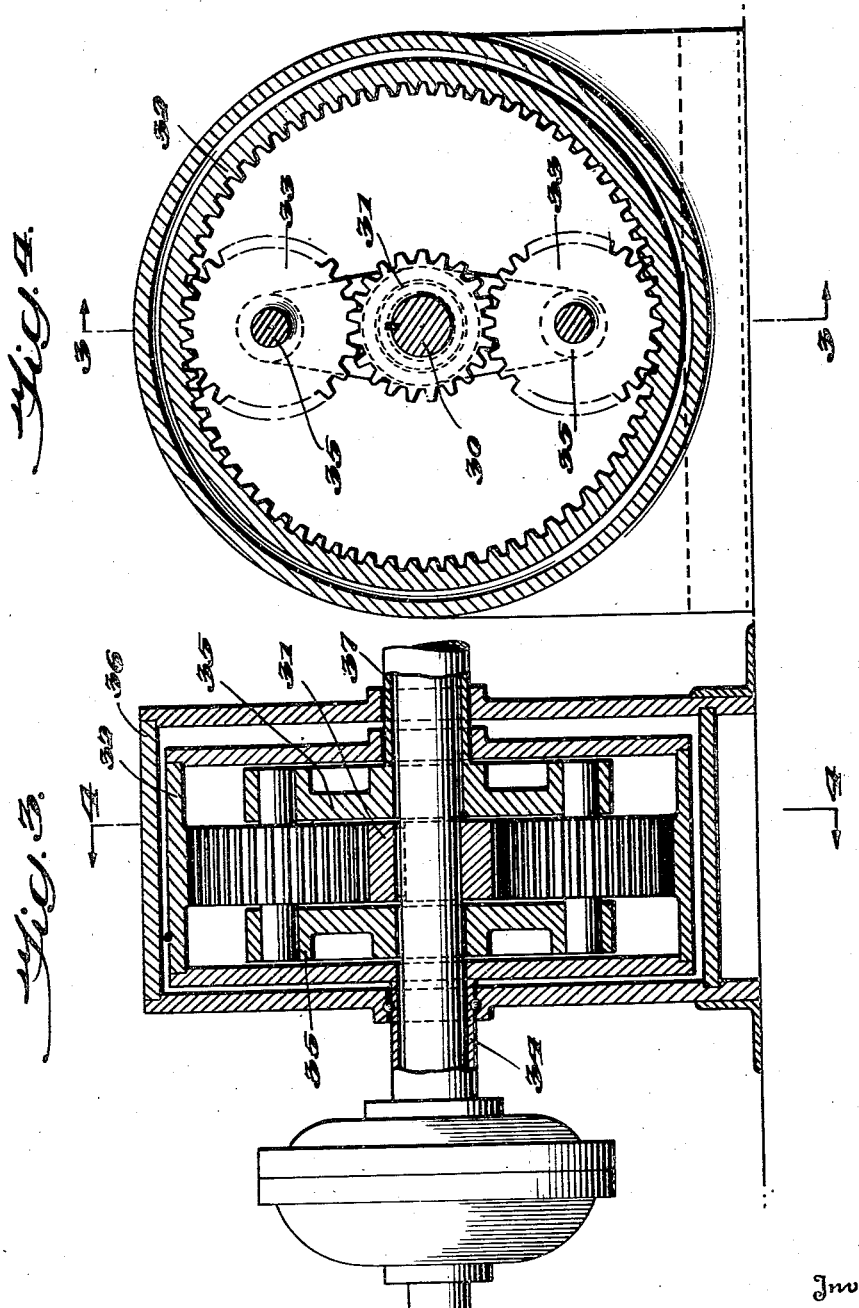

Patented Oct. 15, 1946

2,409,196

UNITED STATES PATENT OFFICE 2,409,196

AUTOMATIC TURBOPLANETARY TRANSMISSION

Thomas P. Cunningham, Kearny, N. J.

Application March 24, 1943, Serial No. 480,390

8 Claims. (Cl. 74—189.5)

My invention relates to automatic turboplanetary transmissions.

The object of my invention is to attain greatly increased delivered torque with a high degree of economy and a minimum of working parts.

This automatic turbo-planetary transmission includes turbines of the fluid type, and it consists of a main power turbine, driving into a compound stepped, planetary gear set, or through any equivalent system of gears, thence into a propeller shaft of the machine being driven.

The device as a whole consists of a differentiating mechanism which automatically integrates the load and thereupon transmits the engine power part through the direct drive path and the remainder through the various geared paths so that the total torque produced at the propeller shaft balances out the applied load at corresponding reduction in speed of the propeller shaft.

In the accompanying drawings:

Fig. 1 is a vertical longitudinal section of one form of my invention on the line 1—1 of Fig. 2, looking in the direction of the arrows;

Fig. 2 is a transverse section through the housing and gears on the line 2—2 of Fig. 1, looking in the direction of the arrows;

Fig. 3 is a fragmentary section on the line 3—3 of Fig. 4, corresponding to Fig. 1, but of an alternative form of my invention; and Fig. 4 is a section on line 4—4 of Fig. 3.

In the form of the invention shown in Figs. 1 and 2 in which I employ a compound stepped planetary gear set, the numeral 1 represents the engine shaft extending through the booster turbine shown at the left, it being keyed to the impeller 11 of the latter, thence through the planetary housing 13 with running clearance through the hubs of the planetary carriers 9, 9, through the drive pinion 3 keyed on the shaft, thence through the tail-gear 8 of the set and through the hub of the rotor 22 with running clearance, thence through the hub of the impeller 21 to which it is keyed, and ending there.

The rotor of the booster turbine 12 is connected to one of the carriers 9 by a sleeve 25 with running clearance over the engine shaft 1. This sleeve 25 is connected to the housing 13 through a non-reversing mechanism 23, which prevents counter-rotation of the carriers due to the reaction of the gearing. A pinion 3 drives gears 4 and 5 axled in the planetary carriers 9—9, on the same axles where pinions 6 and 7 are connected, respectively, to gears 4 and 5 and made integrally with these gears. These two pinions 6 and 7 in turn mesh into and drive the tail-gear 6 which carries an extended hub 26 riding with a running fit over the engine shaft 1, which extended hub 26 terminates in the hub of the rotor 22 of the main turbine, and consequently the two parts revolve as a unit. The main turbine housing 20 is rigidly connected to the rotor 22 of the main turbine, and, consequently, the two parts revolve as a unit. The housing 20 of the main turbine is connected to the propeller or driven shaft 2 of the mechanism being driven.

The planetary gear housing 13 is mounted on a base or frame of the machine where it is bolted rigidly in place so that the housing bearings act as a firm supporting structure for the entire mechanism.

To repeat and briefly emphasize, there are three elements keyed to the shaft 1, namely the impellers 11 and 21 of the booster turbine at the left and the main turbine at the right, respectively, and the drive pinion 3. As previously pointed out, the engine shaft 1 has running clearance through the several remaining elements of the mechanism.

*Operation.*—When power is applied to shaft 1, it is for example caused to revolve clockwise. Impeller 11 of the booster turbine and impeller 21 of the main turbine revolve coincidentally, with shaft 1. If there happened to be a gas engine prime-mover, running at its idling speed, there is insufficient power transmitted through the fluid of the turbines to cause rotors 12 and 22 to revolve. As the engine speed increases, the power transmitted shortly reaches a point where the rotors 12 and 22 are caused to revolve, and, if there were no load resistance, these rotors would run in practical synchronism with the impellers. However, with a load involved, rotor 22 will start very slowly because of being connected directly to the load and rotor 12 driving into the pinion 3 and the carrier axles will encounter the same resistance divided by the proportionate gear ratio up to the axles, and modified by the positive forward driving effect of both turbines and the gear friction in its tendency to retard inter-rotation of the gears among themselves, so that coupled with the fulcrum effect of the carriers 9—9, operating through the non-reversing mechanism 23, the booster turbine is driving the vehicle in low gear through the main turbine housing 20 and the main turbine rotor 22, said housing being connected to the propeller shaft 2. As soon as the propeller shaft 2 begins to turn, the reactive load on the carriers 9—9 releases to such an extent that the planetary axles 27—27 will roll in the forward direction, thence cutting down the gear ratio, increment by increment, until the planetary system is revolving in synchronism with the engine shaft 1, whereupon the entire mechanism is operating at a one to one ratio or in direct drive, or as it is called in motor car parlance, "in high gear."

If a sudden overload should be applied, the turbine rotors 12 and 22 will slip, permitting the planetary to slip back into a ratio which will balance out the load with increased torque at the expense of the propeller shaft speed. As the load lightens, the mechanism climbs to direct drive again. In starting a vehicle off with this mechanism, it is normally in the lowest gear in the stand-still position of the vehicle, and with the mechanism specially designed for the particular vehicle and its prime-mover, the gear ratio will climb to the direct drive as fast as the engine can furnish power to do that job. In the event of a desired sudden acceleration which would overload the engine if driving direct, the planetary system automatically comes into operation due to the turbine rotors 12 and 22 slipping, and the ratio drops into a proportionate gear ratio and thence picks up car speed and steps up the gear ratio to the direct drive point as fast as the engine is able to produce power for this purpose.

The same result would obtain in the case of a car suddenly striking a grade too great for the engine to carry in direct drive.

One point which might well be emphasized in this connection, and which might easily escape attention in relation to the reactive effect of the load acting through the planetary gear mechanism, tending to cause in the case of a set of planetary gears as in this case, a negative rotation of the planetary system as a whole. It has been my observation in experiments made some years ago that this force is very great when starting from standstill, and that its net effect seems to diminish very rapidly after the entire planetary starts to roll in the forward direction. It may not be essential to employ the non-reversing mechanism at all, but when used it is to be designed to withstand the maximum reactive force when can be calculated from the applied loads, speeds, and the gear ratio with which the set is equipped. From that point, the forward movement begins almost instantly, and as this forward motion begins, the maximum gear ratio which obtains at the standstill point begins to drop off to a lower figure, and this continues, say for example, in infinitesimal steps, until the direct point is reached. During this action, the required reactive force is furnished by the direct drive turbine because its tendency is to pull the whole mechanism up to a 1-1 ratio; a second element in the same direction is the pulling up tendency of the gear turbine; and a third element is the friction of the gearing itself, slight in amount, but, nevertheless, in the correct direction to act as a reactive force.

It is also noteworthy that the capacity of this automatic turbo-planetary in direct drive is a sum of the ratings of the two turbines since the power transmitted by each is an additive factor. Furthermore, as nearly as can be determined, while it may appear that the break-away point of the direct drive would be half the rated horsepower figured by adding the two turbines together, as a practical matter this would not be true, because any overload would be restrained in its tendency to cause slip by the fact that the booster turbine is acting through the gear ratio and any slight tendency to slip brings in an increased torque tending to restrain any undue slipping.

During these changes of speed of the various parts, the booster turbine torque output always tends to cause rotation in the forward direction. In other words, it does not act counter to the flow of power through the main turbine. It is important to keep this point in mind in studying various actions and reactions of this mechanism.

The fulcrum for this device, which, in reality, consists of the booster turbine, the compound stepped planetary gear set, the corresponding carriers, and the non-reverser, if and when employed, constitute a rotating fulcrum which furnishes resistance in proportion to the load applied to the propeller shaft 2 of the mechanism.

The functioning of the entire device is such that at any set engine speed, the torque produced on the propeller shaft 2 will increase in direct proportion to any overload applied at the expense of a corresponding reduction in the speed of the propeller shaft. The action of the non-reverser when employed through the booster planetary carriers 9 into the booster planetary gearing, is believed to be a novel means of injecting additional movement and power into an already revolving power mechanism.

In the alternative construction illustrated in Figs. 3 and 4, the drive-shaft is represented by the numeral 30. This extends through the two turbines, the right-hand turbine not being shown. In this construction, the gear 31 is keyed to shaft 30, and the shaft has running clearance through the rest of the mechanism except the impellers, corresponding to impellers 11 and 21 of the former construction (not shown) are keyed to this shaft. In this form of the device, the internal gear 32 has a running fit on the shaft 30 and it is geared to the gear 31 keyed to shaft 30 through the transmission gears 33, 33.

An extended sleeve or hub 34 extends from the rotor (not shown) to the internal gear 32 as shown in Fig. 3, and the gears 33, 33, are axled in the carriers 35 located within the housing 36. The extended hub 37 from the carrier 35 extends to the rotor of the main turbine (not shown).

The shaft 30 is driven as before from any source of power, and, through the booster turbine at the left, power is transmitted as in the former mechanism, but in this instance to the internal gear 32 and thence through the intermediate gears 33 to the pinion 31 on the shaft 30, and through the carrier to the main turbine (not shown) at the right as before.

This direct planetary furnishes twice the leverage against the gear reaction because the fulcrum is at the end of the gear train instead of at the mid-point as in the case of the compound stepped planetary shown in Figs. 1 and 2 and described in connection therewith.

I claim:

1. A traction booster for power transmissions including an engine shaft, a propeller shaft in alignment with the said engine shaft, a main power turbine and a booster turbine, the impellers of both of said turbines being keyed to the said engine shaft, and a planetary gear set including a pinion keyed to the said engine shaft; each of the said turbines including an impeller and a rotor and each turbine having a housing affixed to the rotor and enclosing the impeller; the planetary gearset including a carrier having gears axled therein, and a tail gear, the said axled gears meshing with the said pinion and with the said tail gear, the said tail gear affixed to the rotor of the said main power turbine and the said carrier being affixed to the rotor of the said booster turbine.

2. A traction booster for power transmissions including an engine shaft, a propeller shaft in alignment with said engine shaft, a main power turbine and a booster turbine, the impellers of both being keyed to the said engine shaft, and a planetary gear set, each turbine including an impeller and a rotor, a housing connected with each rotor, the planetary gearset including a pinion keyed to the engine shaft, a carrier having gears axled therein, a tail gear meshing therewith and a non-reversing brake located between a housing enclosing the said gear-set and a rotating part of the mechanism.

3. A traction booster for power transmissions including an engine shaft, a propeller shaft aligned with said engine shaft, a main turbine and a booster turbine, these turbines including an impeller, a rotor and a housing, each housing secured to a rotor, the two impellers keyed to the engine shaft, the housing of one of the turbines keyed to the propeller shaft, a stationary housing, a planetary gearset rotatable within said stationary housing, one of the gears of the planetary set keyed to the engine shaft, a carrier including two parts, axles of gears of the planetary gearset journaled in the carrier, the engine shaft having running clearance through the two rotors of the turbines, the carrier, and gears, and the main housing, with the exception of the previously mentioned gear of the planetary gearset which is keyed to the engine shaft, the carrier having an extended hub which extends to the rotor of one of the turbines, and through which the engine shaft has running clearance.

4. A traction booster for power transmissions including an engine shaft, a propeller shaft aligned with said engine shaft, a main power turbine and a booster turbine, the impellers of both of which are keyed to the engine shaft, and a compound stepped planetary gearset adapted to automatically compensate for a varying load which the propeller shaft drives, said planetary gearset including a pinion keyed to the engine shaft, a tail gear, and a carrier axled on the engine shaft, and connected to the rotor of said booster turbine, and gears axled in the said carrier and meshing with the tail gear of the planetary gearset, and which tail gear is connected with the rotor of the said main turbine.

5. A traction booster for power transmissions including an engine shaft, a propeller shaft aligned with said engine shaft, a main power turbine and a booster turbine keyed to the said engine shaft, a planetary gearset which automatically adapts itself to a varying load which the propeller shaft drives, each turbine including a rotor having a housing secured thereto and an impeller keyed to the engine shaft, the planetary gearset including a pinion gear keyed to the engine shaft, a carrier including two parts, gears axled in the two carrier parts, a hub extending from the rotor of the booster turbine to one of the carrier parts, and an extended hub extending from one of the gear wheels of the planetary set to the rotor of the main turbine, the housing of the said main turbine being keyed to the propeller shaft.

6. A traction booster for power transmissions including an engine shaft, a propeller shaft aligned with said engine shaft, a main power turbine and a booster turbine, keyed to said engine shaft, a planetary gear set which automatically adapts itself to a varying load which the propeller shaft drives, each turbine including a rotor having a housing secured thereto and enclosing an impeller keyed to the engine shaft, the planetary gearset including a pinion, gear keyed to the engine shaft, a carrier including two parts, gears axled in the carrier, a hub extending from one of the rotors to the carrier, and a hub extending from one of the gear wheels of the planetary set to the rotor of the main turbine, the housing of the latter turbine keyed to the propeller shaft, a main stationary housing enclosing the said planetary gearset and a non-reversing brake located between a hub of said stationary housing and the hub extending from the rotor of one of the turbines to the carrier.

7. A traction booster for power transmissions including an engine shaft, a propeller shaft aligned with said engine shaft, a main power turbine and a booster turbine keyed to said engine shaft, a planetary gear set located between said turbines, a main housing enclosing the said planetary gearset, each turbine including a rotor, an impeller keyed to the engine shaft, and a housing secured to each rotor, one of said housings keyed to the propeller shaft, the planetary gearset including a carrier to which the rotor of one turbine is connected by means of an extended hub, gears axled in the carrier, a pinion gear keyed to the engine shaft, and a tail gear connected by an extended hub to the rotor of the other of the turbines, the engine shaft having running clearance through all the parts of the mechanism except the pinion gear of the planetary set and the two impellers.

8. A traction booster for power transmissions including an engine shaft, a propeller shaft aligned with said engine shaft, a main power turbine and a booster turbine keyed to the said engine shaft, a planetary gear set including a pinion gear keyed to the engine shaft, a carrier including two parts, gear wheels axled in the parts of the carrier and geared to the pinion, an internal gear meshed with the gear wheels carried by the carrier, the said turbines including rotors and impellers, the latter keyed to the engine shaft, the rotor of one of the turbines having an extended hub which extends to the internal gear, and the carrier having an extended hub which extends to the rotor of the other turbine.

THOMAS P. CUNNINGHAM.